June 26, 1956 E. M. ROSCHKE 2,752,415

CODING APPARATUS FOR TELEVISION TRANSMITTERS

Filed June 28, 1951

*INVENTOR.*

ERWIN M. ROSCHKE

BY Francis W. Crotty

His Attorney.

2,752,415
Patented June 26, 1956

2,752,415

CODING APPARATUS FOR TELEVISION TRANSMITTERS

Erwin M. Roschke, Broadview, Ill., assignor to Zenith Radio Corporation, a corporation of Illinois Application June 28, 1951, Serial No. 233,966

5 Claims. (Cl. 178—5.1)

Figure 1:
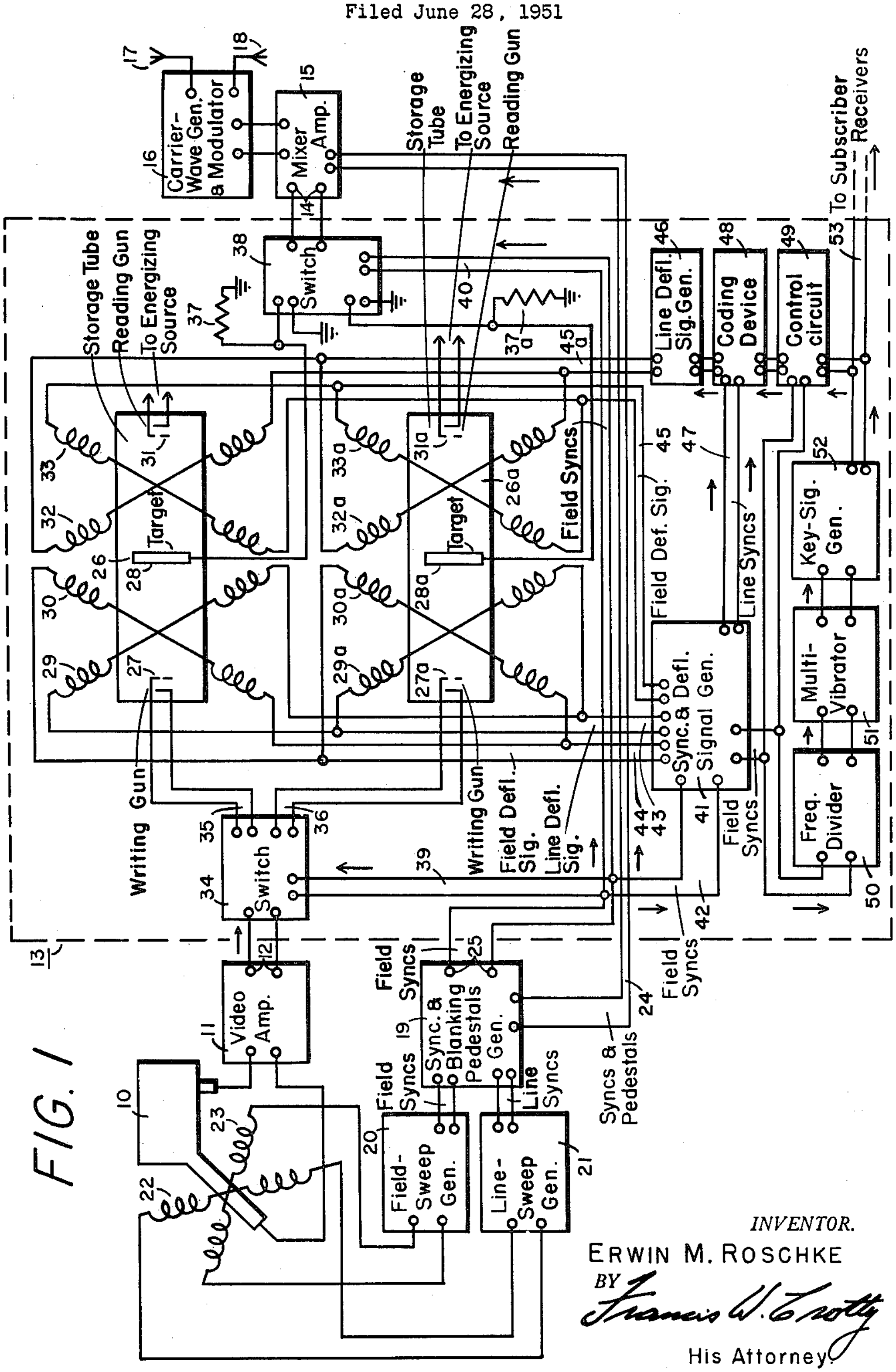

This invention relates to subscriber television systems of the type in which a coded television signal is transmitted over a first channel and a key signal for decoding the coded signal is transmitted to subscribed receivers over a second channel, preferably, a line circuit. More specifically, the present invention is directed to an improved control system or coding apparatus which may be used to great advantage to enable present-day television transmitters, which normally develop standard uncoded television signals, to transmit coded television signals for subscription purposes.

Subscription television systems are disclosed and claimed in Patent 2,510,046, issued May 30, 1950, in the name of Ellett et al., entitled "Radio Wire Signalling System"; and Patent 2,547,598, issued April 3, 1951, in the name of Erwin M. Roschke, entitled "Subscription, Image Transmission System and Apparatus"; both assigned to the present assignee. The present invention provides coding apparatus which may conveniently be constructed as an independent unit which, in turn, may be connected readily and conveniently into the circuit of a television transmitter so that it may operate in subscription systems of the type disclosed in the above-identified patents.

A feature of the coding apparatus of the invention is that it permits effective coding of the television signal without disturbing the scanning process of the image-translating device. Accordingly, the coding apparatus may be conveniently connected into the circuit of an existing conventional television transmitter without altering the circuitry of the various units included therein. Moreover, the coding apparatus may be used at a point remote from the television transmitter to code a television signal supplied thereto over a coaxial cable or the like, and disseminate the coded television signal to subscribers in the surrounding locality.

It is, accordingly, an object of the invention to provide improved coding apparatus for enabling a present-day television transmitter, which normally radiates a standard uncoded television signal, to transmit a coded signal for subscription purposes.

A further object of the invention is to provide improved coding apparatus which may be readily and conveniently connected into the circuit of a television transmitter without materially disturbing pre-existing circuitry therein.

Yet a further object of the invention is to provide improved apparatus for coding a television signal even though that apparatus is located at a point remote from the transmitter.

The features of this invention which are believed to be new are set forth with particularity in the appended claims. The invention itself, however, together with further objects and advantages thereof may best be understood by reference to the following description when taken in conjunction with the accompanying drawing, in which the single figure illustrates a preferred embodiment of the invention incorporated into a television transmitter.

It is to be understood that while apparatus embodying the invention is especially suitable for use as a coding device in a transmitter, it may also be used in a subscription receiver as a decoder to enable the receiver to reproduce the image intelligence represented by a coded broadcast.

The transmitter of Figure 1 includes an image-translating device or pick-up tube 10 of any well-known type connected to a video amplifier 11. The output terminals 12 of video amplifier 11 are coupled to the coding apparatus 13 of the invention enclosed by the broken construction line. This apparatus, in turn, is connected to one pair of input terminals 14 of a mixer amplifier 15 having output terminals connected to a carrier-wave generator and modulator 16. The output terminals of unit 16 are connected to a suitable antenna circuit 17, 18.

The transmitter also includes a synchronizing-signal and blanking-pedestal generating unit 19 which is connected to a field-sweep generator 20 and to a line-sweep generator 21. The output terminals of sweep generators 20, 21 are connected respectively to the line- and field-deflection elements 23 and 22 associated with device 10. Unit 19 is further connected to mixer amplifier 15 by way of leads 24 and supplies line- and field-synchronizing pulses and associated blanking pedestals to the mixer amplifier in the usual manner. Field-synchronizing pulses obtained at further output terminals 25 of unit 19 are supplied to coding apparatus 13 for reasons to be described hereinafter.

Generating unit 19 supplies field-synchronizing pulses to field-sweep generator 20 and line-synchronizing pulses to line-sweep generator 21, and in this manner controls the operation of the sweep generators and, hence, the line- and field-deflection of the cathode-ray beam developed in device 10 so that the device generates a video signal during a series of successive line- and field-trace intervals. The video signal is amplified in video amplifier 11 and coded, in a manner to be described, by coding apparatus 13 which effects coding by varying the timing of the video-signal trace intervals from time to time in accordance with a coding schedule. The coded video signal is applied to mixer amplifier 15 wherein it is mixed with the line- and field-synchronizing pulses and associated pedestals developed by generator 19 with fixed timing during retrace intervals of device 10 which are interposed between its successive video-signal trace intervals.

Mixer amplifier 15, therefore, produces at its output terminals a television signal including video and synchronizing components, the television signal being effectively coded by reason of the varying time relation of the video components relative to the fixed timing of the synchronizing components. The coded television signal is modulated on a suitable picture carrier in carrier-wave generator and modulator 16 and radiated to subscriber receivers by antenna circuit 17, 18.

It is to be noted that coding apparatus 13 is connected into the circuit of the transmitter merely by breaking the usual connection between video amplifier 11 and mixer amplifier 15, and by providing a connection to generating unit 19 to derive field-synchronizing pulses therefrom. It is also to be noted that the circuitry of the various units of the transmitter, other than the coding apparatus, is entirely conventional and is in no way interfered with by the coding mechanism. Moreover, the coding of the television signal is accomplished without disturbing the scanning processes of device 10.

The illustrated embodiment of coding apparatus 13 includes a pair of storage or memory devices 26, *26a* of any well-known construction. These devices include input electrodes 27, *27a* incorporated in well-known electron guns for developing in each such device what is usually termed a "writing cathode-ray beam." The writing beams are scanned over target electrodes 28, *28a* by means of line- and field-deflection elements 29, 30 and 29*a*, 30*a*. The devices also include additional electron guns 31, 31*a* which are mounted at the opposite end of each device with respect to guns 27, 27*a* and are employed to develop what is termed a "reading cathode-ray beam" within each device. The devices have associated therewith further line- and field-deflection elements 32, 33, 32*a*, 33*a* for scanning the reading beams over the sides of targets 28, 28*a* opposite to those scanned by the writing beams.

Terminals 12 of video amplifier 11 are connected to an electronic switch 34 of any well-known construction arranged to connect the amplifier alternately to leads 35 extending to electron gun 27 and to leads 36 extending to electron gun 27*a*. Targets 28, 28*a* are connected to a point of reference potential, such as ground, through load impedances 37, 37*a* and these impedances are connected to the input terminals of another electronic switch 38 which may be similar in construction to switch 34. Switch 38 alternately applies the signal developed across load impedance 37 or the signal developed across load impedance 37*a* to input terminals 14 of mixer amplifier 15. Field-synchronizing pulses derived from output terminals 25 of unit 19 are applied to switches 34, 38 over leads 39, 40 to control their operation.

The coding apparatus also includes a synchronizing- and deflection-signal generating unit 41 which is connected to output terminals 25 of unit 19 by way of leads 42 to synchronize the operation of generating units 19 and 41. Unit 41 supplies line-deflection signals to deflection elements 29, 29*a* by way of leads 43 and, field-deflection signals to elements 30, 30*a* by way of leads 44. Unit 41 further supplies field-deflection signals to elements 33, 33*a* by way of leads 45 and line-synchronizing pulses to a line-deflection signal generator 46 over leads 47 through a coding device 48. Generator 46 is connected to line-deflection elements 32, 32*a* by leads 45*a* and supplies line-deflection signals thereto.

Generating unit 41 is also connected to a frequency divider 50 and supplies field-synchronizing pulses thereto. The frequency divider may be of the random type disclosed in copending application Serial No. 32,457, filed June 11, 1948, issued March 11, 1952, as Patent No. 2,588,413, in the name of Erwin M. Roschke entitled "Random Frequency Divider" and assigned to the present assignee. The output terminals of frequency divider 50 are connected to a multivibrator 51 which may be of the well-known "Eccles Jordan" type. That is, the multivibrator has two stable operating conditions and may be triggered from one to the other by a pulse of a certain polarity and returned to its first operating condition by a succeeding pulse of the same polarity.

Multivibrator 51 is connected to a key-signal generator 52, to turn on the key-signal generator during intervals when the multivibrator is in a selected one of its operating conditions, causing the generator to develop bursts of key signal on line circuit 53 during such intervals. Line circuit 53 extends to various subscriber receivers so that the key signal may be disseminated thereto and actuate decoding apparatus at such receivers to enable them to decode the coded television signal and reproduce the image intelligence represented thereby. Line circuit 53 is also connected to a pair of input terminals of a control circuit 49, the control circuit having further input terminals connected to generating unit 41 for deriving field-synchronizing pulses therefrom, and having output terminals connected to coding device 48.

Switch 34 is actuated from one operating condition to another at a fixed repetition rate by the field-synchronizing pulses derived from unit 19. Consequently, the video signal developed in one field-trace interval by device 10 is delivered to storage device 26 while the signal in the next field-trace interval is supplied to storage device 26*a*, and so on. These video signals are inscribed on targets 28, 28*a* by the writing beams of devices 26, 26*a* which are intensity-modulated by such signals and scanned over the targets by deflection elements 29, 30 and 29*a*, 30*a*. This scansion of the target electrodes establishes a charge distribution thereon representing the signal modulation of the writing beams. The deflection signals applied to elements 32, 32*a* and 33, 33*a* of the storage devices cause their reading cathode-ray beams, originating at guns 31 and 31*a*, to scan the target electrodes on the obverse side to that subjected to the writing beams. The scanning of the target electrodes by the reading beams results in the development of signal potentials across load impedances 37 and 37*a*, the signal generated in each case being determined by and representing the charge distribution of the associated target electrode. Switch device 38, like switch 34, is actuated from one operating condition to another by the field-synchronizing pulses from unit 19. It operates in synchronism with switch 34 but in such a relative phase that during the intervals when switch 34 supplies the video signal to storage device 26*a*, switch 38 applies the signal developed across load impedance 37 to mixer amplifier 15; and during the intervals when switch 34 applies the video signal to storage device 26, switch 38 applies the signal developed across load impedance 37*a* to the mixer amplifier.

Therefore, the video signal developed by device 10 during successive field-trace intervals is stored alternately in storage devices 26, 26*a*, and during each field-trace interval in which the video signal is being stored in device 26, the video signal stored in device 26*a* during the preceding trace interval is applied to mixer amplifier 15. Alternately, during each field-trace interval wherein the video signal is being stored in device 26*a*, the video signal stored in device 26 during the preceding trace interval is applied to mixer amplifier 15.

The line- and field-deflection signals developed by generating unit 41 on leads 43 and 44 are synchronized with the corresponding signals developed by sweep generators 20 and 21 so that the writing beams in devices 26, 26*a* are deflected in synchronism and phase with the deflection of the cathode-ray beam in device 10. Moreover, the field-deflection signal developed by generating unit 41 on leads 45 is synchronized and phased with the field-deflection signal of sweep generator 20 so that the field deflection of the reading beams in devices 26, 26*a* is synchronized and phased with the field deflection of device 10.

The arrangement, as thus far described, translates the video signal without change or alteration to mixer amplifier 15 by way of alternate paths including devices 26, 26*a*. Consideration will now be given to the manner in which the illustrated embodiment of the invention alters the signal information to effect coding.

The line-synchronizing pulses derived from generating unit 41 and supplied to coding device 48 over leads 47 have the same timing and are in phase with the line-synchronizing pulses supplied to line-sweep generator 21 by generating unit 19. However, coding device 48 is controlled by control circuit 49 to vary the timing of these line-synchronizing pulses as applied to deflection-signal generator 46, specifically to shift their timing a preselected amount relative to the timing of the pulses received over leads 47 and during spaced operating intervals in accordance with a coding schedule. For example, coding device 48 may be so controlled that during certain intervals it passes the pulses on leads 47 to generator 46 with unaltered timing, and at spaced intervals delays these pulses by a selected amount. This causes the timing of the line scansion of targets 28, 28*a* by the reading beams to be altered a corresponding amount during the same spaced intervals so that the video signal developed across load impedances 37, 37*a* of devices 26, 26*a* occurs in a series of successive trace intervals having a timing which is likewise altered relative to the trace intervals of the video signal developed by device 10. As a result, the timing of the video components of the television signal developed by mixer amplifier 15 varies in accordance with a coding schedule relative to the synchronizing components of that signal which have a fixed timing. In this manner, the radiated television signal is effectively coded.

Frequency divider 50 triggers multivibrator 51 between its two stable operating conditions so that it is in a second operating condition during spaced intervals occurring at random times and determined by the random frequency division of the field-synchronizing pulses by the divider. Key-signal generator 52, in turn, generates bursts of key signal on line circuit 53 during these spaced intervals. The bursts of key signal are applied to control circuit 49 wherein they act in conjunction with the field-synchronizing pulses to apply a control signal to coding device 48 so that it may perform its coding function.

Coding device 48 and control circuit 49 may be identical to the corresponding units disclosed and claimed in copending application 79,432, filed May 3, 1949 in the name of Albert Cotsworth III et al., issued March 24, 1953 as Patent 2,632,799, entitled "Decoding Apparatus for Television Receivers" and assigned to the present assignee; or in aforementioned Patent 2,510,046 entitled "Radio-Wire Signalling System," Ellett et al., May 30, 1950, also assigned to the present assignee. Control circuit 49 supplies a control signal to coding device 48, the control signal being initiated and terminated during the field-retrace intervals succeeding the initiation and termination of each key-signal burst on line circuit 53. By this means, actuation of the coding device is delayed slightly with respect to the key-signal bursts so that any slight time delays which the line circuit 53 may impart to these bursts have no effect on the synchronous operation between the coding apparatus at the transmitter and corresponding decoding apparatus at the various subscriber receivers. Moreover, the control signal developed by control circuit 49 effects timing changes in the television signal only during retrace intervals and precludes any possibility of distortion that might otherwise arise should such alterations take place during trace intervals.

The invention provides, therefore, improved coding apparatus that may be simply and conveniently connected into the circuit of an existing transmitter. The coding apparatus of the invention codes the television signal at a point subsequent to the image-translating device 10 and does not interfere with the actual scanning processes of this device. As previously pointed out, this feature adds to the convenience with which the apparatus may be connected into a standard television transmitter and, additionally, enables the apparatus to be utilized at a point remote from the transmitter to perform its coding function.

In the illustrated embodiment of the invention coding of the television signal is effected by controlling the scanning of the reading beams of storage devices 26 and **26*a* in such a manner that the timing of the video-signal trace intervals of these devices is altered relative to the timing of the video-signal trace intervals of device 10, this alteration occurring at spaced intervals in accordance with the coding schedule developed by units 50, 51, 52 and 48, 49. It is to be understood, however, that the mode of the video signal developed by the storage devices may be altered in other ways relative to the mode of the video signal developed by device 10. For example, the scanning of the reading beams may be so controlled that during spaced intervals the successive video-signal fields developed by the storage devices are reversed relative to corresponding fields developed by device 10**, or certain lines in each field may be inverted, or some other mode change may be effected.

While a particular embodiment of the invention has been shown and described modifications may be made and it is intended in the appended claims to cover all such modifications as fall within the true spirit and scope of the invention.

I claim:

1. A control system for television apparatus for changing the mode of a video signal derived during a series of successive trace intervals from a video-signal source, said control system comprising: a first and a second storage device each having a scanning system associated therewith to effect signal storage therein; a switching device for applying the video signal from said source to said first and second storage devices during alternate intervals each corresponding to a selected number of the aforementioned trace intervals; a further scanning system associated with each of said storage devices to effect reading of the signal information stored in said devices to develop an output video signal during a further series of trace intervals; coding apparatus coupled to at least one of said storage devices for altering the mode of said output video signal developed by said storage devices relative to the mode of the video signal from said source; and a coding signal source coupled to said coding apparatus for effecting actuation thereof to alter the mode of said output video signal from time to time in accordance with a coding schedule.

2. A control system for television apparatus for changing the mode of a video signal derived during a series of successive trace intervals from a video-signal source, said control system comprising: a first and a second storage device each having a scanning system associated therewith to effect signal storage therein; a switching device for applying the video signal from said source to said first and second storage devices during alternate intervals each corresponding to a selected number of the aforementioned trace intervals; a further scanning system associated with each of said storage devices to effect reading of the signal information stored in said devices to develop on output video signal during a further series of trace intervals; coding apparatus coupled to said further scanning systems for altering the timing of said further series of video-signal trace intervals relative to the timing of said video-signal trace intervals of said source; and a coding signal source coupled to said coding apparatus for effecting actuation thereof to alter the timing of said further series of video-signal trace intervals in accordance with a coding schedule.

3. A control system for television apparatus for changing the mode of a video signal derived during a series of successive trace intervals from a video-signal source, said control system comprising: a first and a second storage device each having a scanning system associated therewith to effect signal storage therein; a switching device for applying the video signal from said source to said first and second storage devices during alternate intervals each corresponding to a selected number of the aforementioned trace intervals; a further scanning system associated with each of said storage devices to effect reading of the signal information stored in said devices to develop an output video signal during a further series of trace intervals; coding apparatus coupled to said further scanning systems for altering the mode of said output video signal developed by said storage devices relative to the mode of the video signal from said source; a coding signal source coupled to said coding apparatus for effecting actuation thereof to alter the mode of said output video signal in accordance with a coding schedule; and a second switching device operating inversely to said first-mentioned switching device for applying the video signal developed by each of said storage devices to the output terminals of said control system during alternate intervals each corresponding to a selected number of trace intervals of said further series.

4. A control system for television apparatus for changing the mode of a video signal derived during a series of successive trace intervals from a video-signal source, said control system comprising: a first and a second storage device each having a scanning system associated therewith to effect signal storage therein; a scanning-signal generating unit coupled to said scanning systems for effecting scansion in said storage devices in synchronism with the timing of the aforementioned trace intervals of said source; a switching device for applying the video signal from said source to said first and second storage devices during alternate intervals each corresponding to one of the aforementioned trace intervals; a further scanning system associated with each of said storage devices to effect reading of the signal information stored in said devices to develop an output video signal during a further series of trace intervals; coding apparatus coupled to said further scanning systems for altering the mode of said output video signal developed by said storage devices relative to the mode of the video signal from said source; a coding signal source coupled to said coding apparatus for effecting actuation thereof to alter the mode of said output video signal in accordance with a coding schedule; and a second switching device for applying the video signal developed by each of said storage devices to said output terminals of said control system during alternate intervals each corresponding to one of the trace intervals of said further series.

5. A control system for television apparatus for changing the mode of a video signal derived during a series of successive trace intervals froma video-signal source, said control system comprising: a first and a second scanning device each having a scanning system associated therewith to effect signal storage therein; a scanning-signal generating unit synchronized with said source and coupled to said scanning systems for effecting scansion in said storage devices in synchronism with the timing of the aforementioned trace intervals of said source; a switching device synchronized with said source for applying the video signal from said source to said first and second devices during alternate intervals each corresponding to one of the aforementioned trace intervals; a further scanning system associated with each of said storage devices to effect reading of the signal information stored in said devices to develop an output video signal during a further series of trace intervals; coding apparatus coupling said generating unit to said further scanning systems for altering the timing of said further series of video-signal trace intervals relative to the timing of said video-signal trace intervals of said source; a coding signal source coupled to said coding apparatus for effecting actuation thereof to alter the timing of said further series of video-signal trace intervals from time to time in accordance with a coding schedule; and a second switching device synchronized with said source and operating inversely to said first-mentioned switching device for applying said output video signal developed by each of said storage devices to the output terminals of said control system during alternate intervals each corresponding to one of the trace intervals of said further series.

References Cited in the file of this patent

UNITED STATES PATENTS

| | | |
|---|---|---|
| 2,547,598 | Roschke | Apr. 3, 1951 |

FOREIGN PATENTS

| | | |
|---|---|---|
| 928,783 | France | Dec. 8, 1947 |